US012123458B2

(12) United States Patent
Gurvich et al.

(10) Patent No.: US 12,123,458 B2
(45) Date of Patent: Oct. 22, 2024

(54) DRIVE SHAFTS

(71) Applicant: Goodrich Corporation, Charlotte, NC (US)

(72) Inventors: Mark R. Gurvich, Middletown, CT (US); Brayton Reed, New York Mills, NY (US); Michael King, Sauquoit, NY (US); Joyel M. Schaefer, Earlville, NY (US)

(73) Assignee: Goodrich Corporation, Charlotte, NC (US)

( * ) Notice: Subject to any disclaimer, the term of this patent is extended or adjusted under 35 U.S.C. 154(b) by 439 days.

(21) Appl. No.: 17/484,793

(22) Filed: Sep. 24, 2021

(65) Prior Publication Data

US 2023/0095420 A1    Mar. 30, 2023

(51) Int. Cl.
*F16C 1/02* (2006.01)
*F16D 3/00* (2006.01)

(52) U.S. Cl.
CPC ............ *F16C 1/02* (2013.01); *F16D 3/005* (2013.01)

(58) Field of Classification Search
CPC ................................. F16C 1/02; F16D 3/005
USPC ............................................. 464/58, 60, 78
See application file for complete search history.

(56) References Cited

U.S. PATENT DOCUMENTS

| 779,374 | A | * | 1/1905 | Phillips | F16D 3/72 464/60 |
| 3,390,546 | A | * | 7/1968 | Hollis | F16D 3/72 464/78 |
| 3,869,877 | A | | 3/1975 | Brahler | |
| 4,203,305 | A | | 5/1980 | Williams | |
| 5,803,812 | A | * | 9/1998 | Kakiuchi | F16C 1/02 464/58 |
| 6,409,606 | B1 | | 6/2002 | Nakajima et al. | |
| 11,859,665 | B2 | * | 1/2024 | Gurvich | F16C 3/026 |
| 2005/0049054 | A1 | | 3/2005 | Laskey et al. | |

(Continued)

FOREIGN PATENT DOCUMENTS

| EP | 1336770 A2 | 8/2003 |
| EP | 3809003 A1 | 4/2021 |

(Continued)

OTHER PUBLICATIONS

Extended European Search Report, of the European Patent Office, mailed on Jan. 25, 2023, in corresponding European Patent Application No. 22197841.4.

*Primary Examiner* — Greg Binda
(74) *Attorney, Agent, or Firm* — Kinney & Lange, P. A.

(57) ABSTRACT

A drive shaft which includes a first tube body having one or more first body channels defined through a wall thickness thereof. The one or more channels are configured to increase bending and/or axial flexibility of the first tube body while only allowing for a less than proportional reduction in torsional stiffness of the first tube body. A second tube body can be concentrically disposed relative to the first tube body and connected to the first tube body at a first end portion and a second end portion. The second tube body can include one or more second body channels defined through a wall thickness thereof. The one or more channels are configured to increase bending and/or axial flexibility of the second tube body while only allowing for a less than proportional reduction in torsional stiffness of the second tube body.

20 Claims, 6 Drawing Sheets

(56) References Cited

U.S. PATENT DOCUMENTS

| | | |
|---|---|---|
| 2017/0082137 A1 | 3/2017 | Narayanan Nampy et al. |
| 2017/0159699 A1 | 6/2017 | Barnes |
| 2019/0128334 A1 | 5/2019 | Pollitt |

FOREIGN PATENT DOCUMENTS

| | | | |
|---|---|---|---|
| FR | 1148387 | * 12/1957 | ..................... 464/58 |
| GB | 2141722 A | 1/1985 | |
| WO | 2021090165 A1 | 5/2021 | |

* cited by examiner

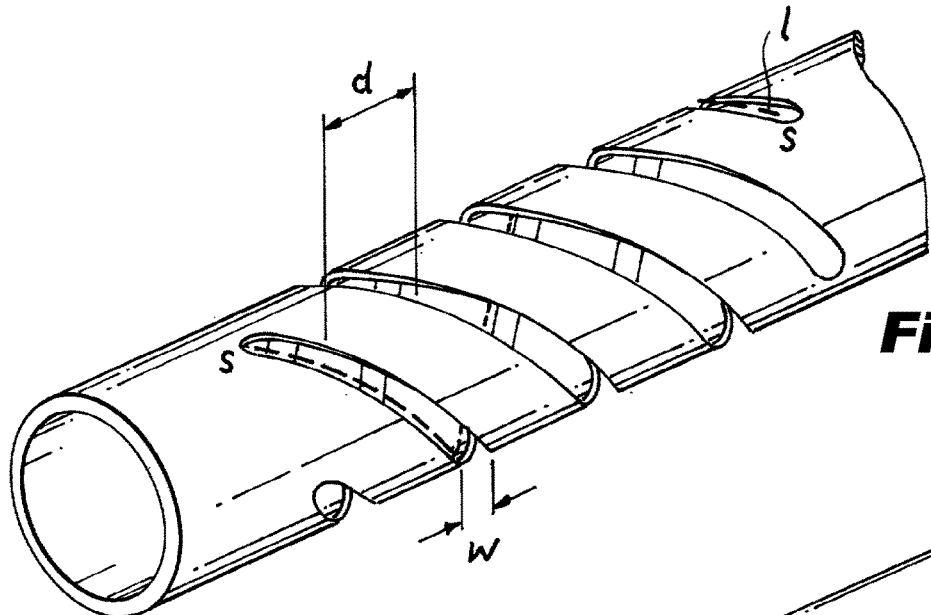
Fig. 2A
Fig. 2B
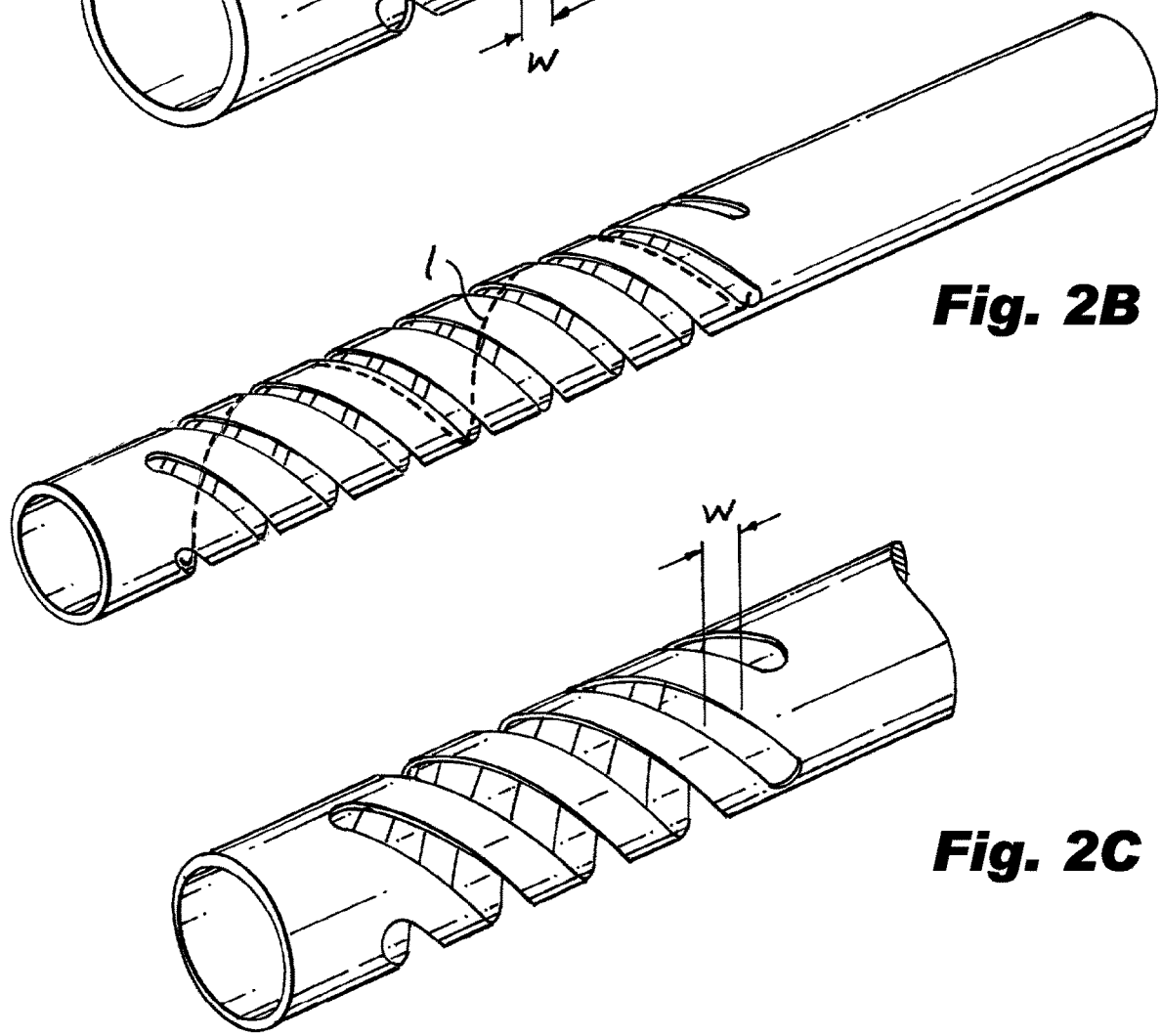
Fig. 2C

Fig. 2D
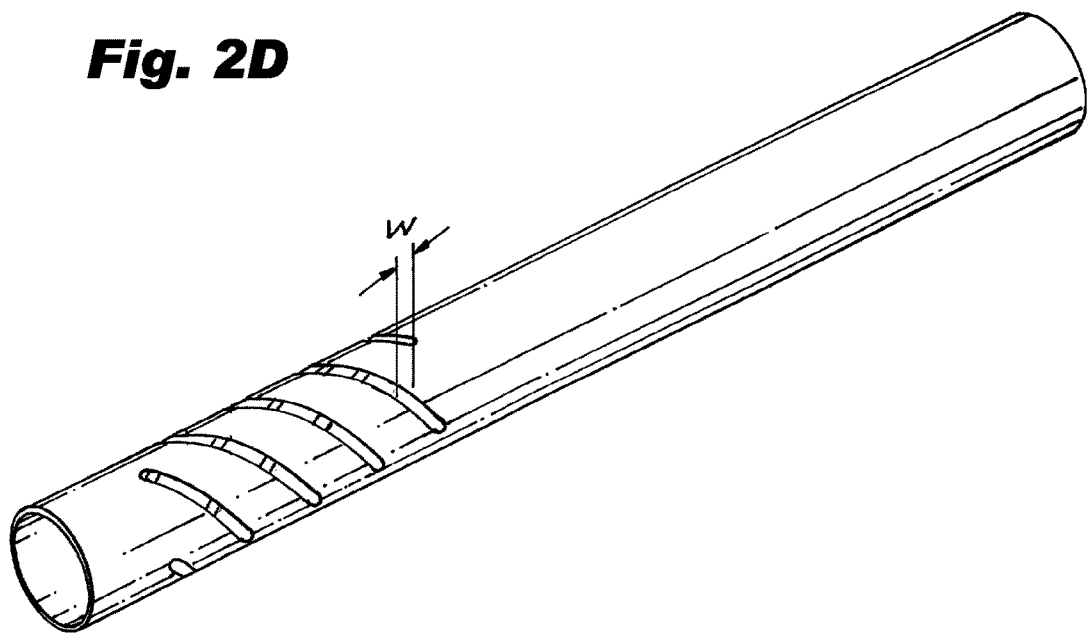
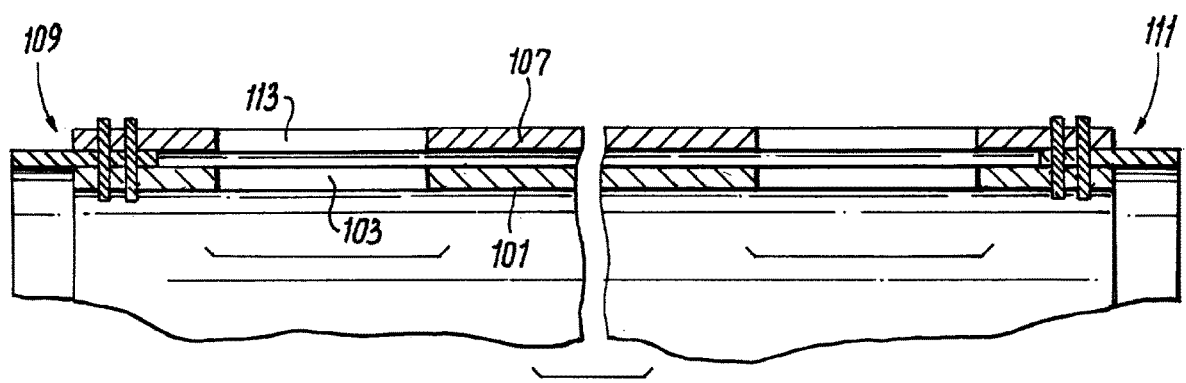
Fig. 3A
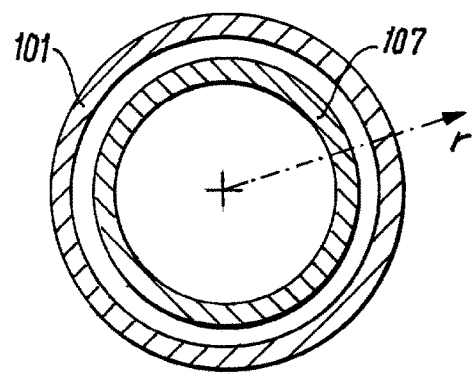
Fig. 3B

DRIVE SHAFTS

FIELD

This disclosure relates to drive shafts.

BACKGROUND

Drive shafts are typically used to transfer torsional moments and rotation between a source of power (e.g., engine) and application (e.g., rotor or wheels). However, mutual misalignments or movements may be observed at opposite ends of drive shafts, reflected in additional bending and/or axial deformations. Therefore, in many engineering applications, drive shafts are expected to deliver two conflicting structural requirements. Firstly, drive shafts may be desired to be very stiff and strong under torque, but, on the other hand, also be very flexible under bending and/or axial loading conditions. To satisfy this challenging dilemma, a conventional approach is to have a combination of flexible axi-symmetric diaphragms and a cylindrical tube (a drive shaft body). The diaphragm is usually an axi-symmetric thin-wall mechanism working as a flexible spring under bending/axial loads but still very stiff under torque due to its circular shape.

Conventional diaphragms, however, have relatively high cost, require a time-consuming fabrication process, have very high requirements for acceptable quality, require ordering parts for machining in advance, and create potential risks of damages, especially in welded areas, as they are the weakest parts of drive systems. In addition, diaphragms often require some additional space in the radial direction, making the drive shaft body have a smaller diameter due to limited available space. Smaller tube diameters are reflected in lower torsional strength, stiffness, resistance to buckling and vibrational response, making them less weight-efficient with respect to structural integrity.

Such conventional methods and systems have generally been considered satisfactory for their intended purpose. However, there is still a need in the art for improved drive shafts. This disclosure provides a solution for this need.

SUMMARY

In accordance with at least one aspect of this disclosure, a drive shaft includes, a first tube body having one or more helical first body channels defined through a wall thickness thereof, the one or more channels configured to increase bending and/or axial flexibility of the first tube body while only allowing for a less than proportional reduction in torsional stiffness of the first tube body. A second tube body can be concentrically disposed relative to the first tube body and connected to the first tube body at a first end portion and a second end portion.

In embodiments, the second tube body can include one or more helical second body channels defined through a wall thickness thereof, the one or more channels configured to increase bending and/or axial flexibility of the second tube body while only allowing for a less than proportional reduction in torsional stiffness of the second tube body.

In certain embodiments, the one or more first body channels can be angled at a first channel angle relative to an axial direction such that the one or more first body channels form one or more first helical pathways in the first tube body. In certain embodiments, the one or more second body channels can be angled at a second channel angle relative to an axial direction such that the one or more second body channels form one or more second helical pathways in the second tube body such that the second the second channel angle and the first channel angle have orientations mutually symmetric with respect to axial direction.

In certain embodiments, the first channel angle can be about 45 degrees relative to the axial direction, and the second channel angle can be about −45 degrees relative to the axial direction such that the one or more first body channels and the one or more second body channels have orientations mutually symmetric with respect to the axial direction with respect to the axial direction to provide additional torsional stiffness to the driveshaft. In certain embodiments, the one or more first or second helical pathways can include a plurality of helix channels axially offset to wind within each other.

In embodiments, the one or more first and/or second body channels can be defined having limited axial length and positioned at one or more axial locations of the first and/or second tube bodies. In certain embodiments, the one or more axial locations can include each end portion of the first and/or second tube bodies. In certain embodiments, the one or more axial locations can include an axial middle portion of the first and/or second tube bodies. In certain embodiments, the one or more axial locations can include both the axial middle portion and each end portion of the first and/or second tube bodies. In certain embodiments, the one or more axial length and/or locations of the first body channels can be different than the one or more axial length and/or locations of the second body channels.

In embodiments, the system can further include a sleeve configured to connect to one or both of the first and second tube bodies at a respective end thereof. In certain embodiments, the sleeve can separately connect to the first and second tube bodies at different axial locations. In certain embodiments, the sleeve includes a plurality of sleeve bodies connected together. In certain embodiments, the sleeve can be a single sleeve body.

In embodiments, the second tube body can include at least a portion configured to contact an inner diameter of the first tube body where there is a connection between the first and second tube bodies. The sleeve can be connected to both the first and second tube bodies. In certain embodiments, the sleeve can connect to one of the first tube body or the second tube body, and the first and second tube bodies can be connected together separately from the sleeve. In certain embodiments, at least a portion the first and/or second tube body can include a wall thickened section. In certain embodiments, a third tube body can be concentrically disposed between the first tube body and second tube and connected to the first tube body and the second tube body at the first end portion and the second end portion.

In certain embodiments, a third tube body concentrically disposed relative to the second tube body and having one or more helical third body channels defined through a third wall thickness thereof, wherein the one or more third body channels are angled at a third channel angle relative to an axial direction such that the one or more third body channels form one or more third helical pathways in the third tube body, wherein the third body is connected to the first tube body and the second tube body at the first end portion and the second end portion.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 2A is a partial perspective view of the drive shaft of FIG. 1, showing a configuration of the one or more channels defied therethrough;

FIG. 2B is a partial perspective view of an embodiment of a drive shaft in accordance with this disclosure, showing another configuration of the one or more channels defied therethrough;

FIG. 2C is a partial perspective view of an embodiment of a drive shaft in accordance with this disclosure, showing another configuration of the one or more channels defied therethrough;

FIG. 2D is a partial perspective view of an embodiment of a drive shaft in accordance with this disclosure, showing another configuration of the one or more channels defied therethrough;

FIG. 3A is a schematic axi-symmetric axial cross-sectional view of the drive shaft of FIG. 1, showing connections between a first tube body and a second tube body;

FIG. 3B is a schematic diametric cross-sectional view of the drive shaft of FIG. 3A, showing the first tube body and the second tube body concentrically arranged;

DETAILED DESCRIPTION

Figure 1:
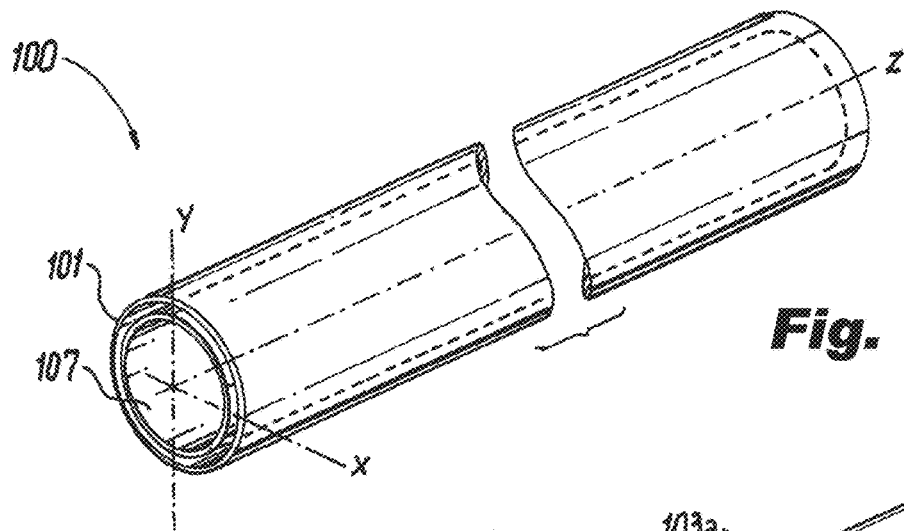
FIG. 1 is a schematic perspective view of an embodiment of a drive shaft in accordance with this disclosure, showing a first and second tube body.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIG. 2-FIG. 7B.

In accordance with at least one aspect of this disclosure, as shown in FIG. 1-FIG. 3B, a drive shaft 100 can include a first tube body 101 (e.g., an outer shaft) having one or more first body helically-oriented under angle $\alpha 1$ channels 103 defined (e.g., machined) through a wall thickness 105 thereof. The one or more channels 103 can be configured to increase bending and/or axial flexibility (e.g., spring-like) of the first tube body 101 while only allowing for a less than proportional reduction in torsional stiffness of the first tube body 101. In certain embodiments, such as shown in FIG. 2A, the first tube body 101 can have any suitable number of channels 103 (e.g., four as shown in this specific example) with any suitable spacing therebetween (e.g., uniform as shown or non-uniform). The channels 103 can have any suitable angular length l (e.g., 360 degrees as shown), any suitable width w, any suitable distance between channels d, any suitable end shape s (e.g., semi-circular as shown). In embodiments, the design variables can be uniformly spaced and/or be the same along the entire first body or be non-uniformly spaced and/or be different.

Additional variations of first tube body 101 and channels 103 are shown in FIGS. 2B through 2D, for example, an axial channel length l of 720 degrees as shown in FIG. 2B (e.g. double that as shown in FIG. 2A), a width w of channels 103 as shown in FIG. 2C (e.g. double that shown in FIG. 2A), or a width w of channels 103 as shown FIG. 2D (e.g. half that shown in FIG. 2A). The varied channels 103 as shown in FIGS. 2B-2D can provide different properties to those shown in FIG. 2A. For example, greater axial length as shown in 2B, and greater width of the channel 103 as shown in FIG. 2C allow for greater flexibility, and for a greater distances, while the thinner channels 103 of FIG. 2D allow for greater stiffness. In embodiments, the sizes and shapes of the channels 103 can be tuned to a desired bending performance while maintaining a desired torsional performance. Those having ordinary skill in the art will appreciate how to tune the channels 103 to achieve the desired performance in view of this disclosure without undue experimentation.

A second tube body 107 (e.g., inner shaft) can be concentrically disposed relative to the first tube body 101 and connected to the first tube body 101 at a first end 109 and a second end 111, as shown in FIG. 3B. The second tube body 107 can include one or more second body helically-oriented under angle α2 channels 113 defined through a wall thickness 115 thereof. As used herein, a wall thickness of tube bodies 101, 107 includes a thickness of the tube body in the radial direction. The wall thickness can change based on differences in tube body diameters, channel geometries and configurations. Therefore, the wall thickness of the tube bodies 101, 107 should be based on special static analysis to be performed analytically or computationally according to conventional methods of the strength of materials. Such a determination will be readily understood by one having ordinary skill in the art without undue experimentation. In embodiments, the one or more channels 113 configured to increase bending and/or axial flexibility of the second tube body 107 while only allowing for a less than proportional reduction in torsional stiffness of the second tube body 107.

Figure 2:
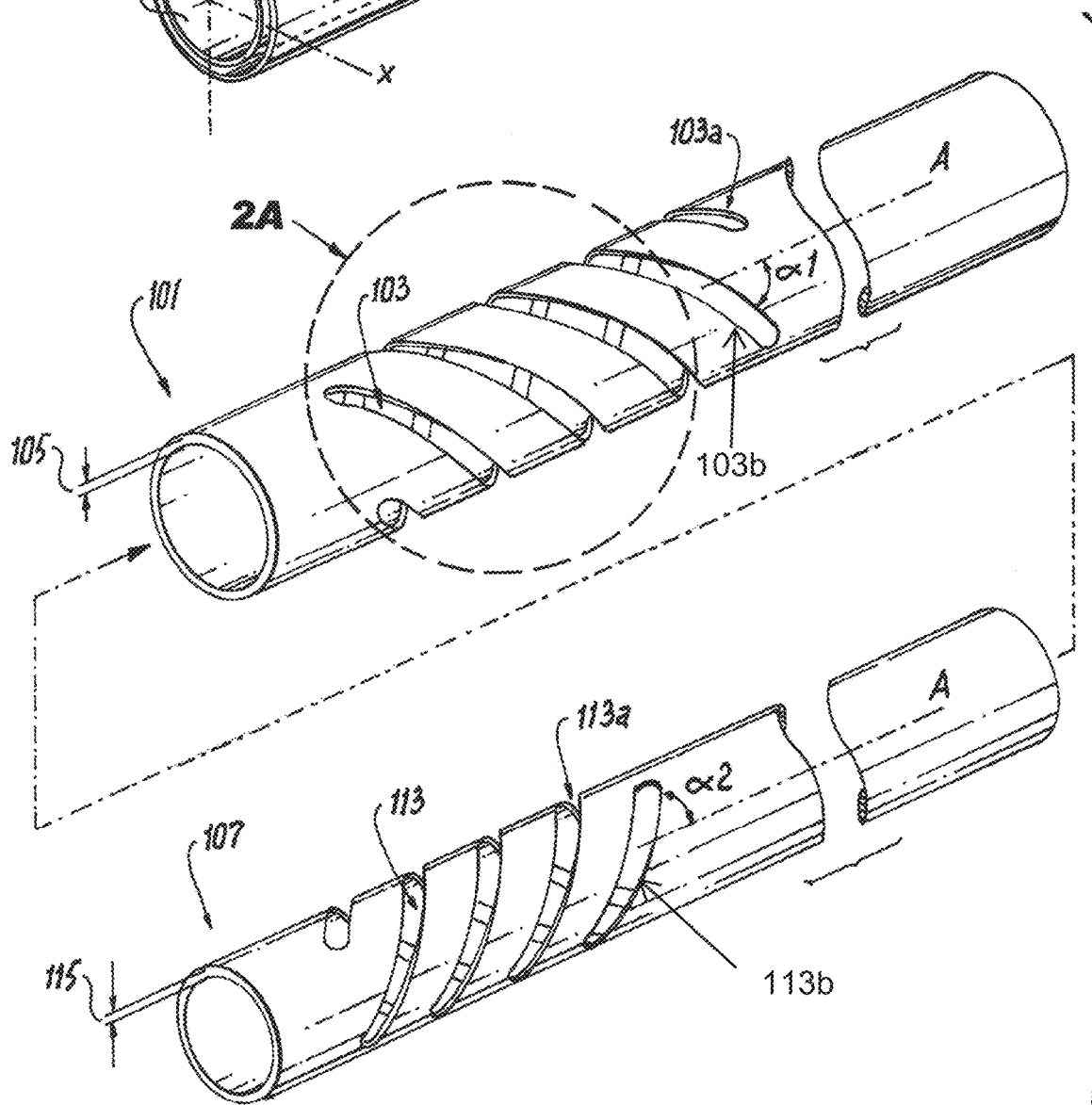
FIG. 2 is a schematic perspective view of an embodiment of a drive shaft in accordance with this disclosure, showing one or more channels defined in the first and second bodies, respectively.
Figure 4A:
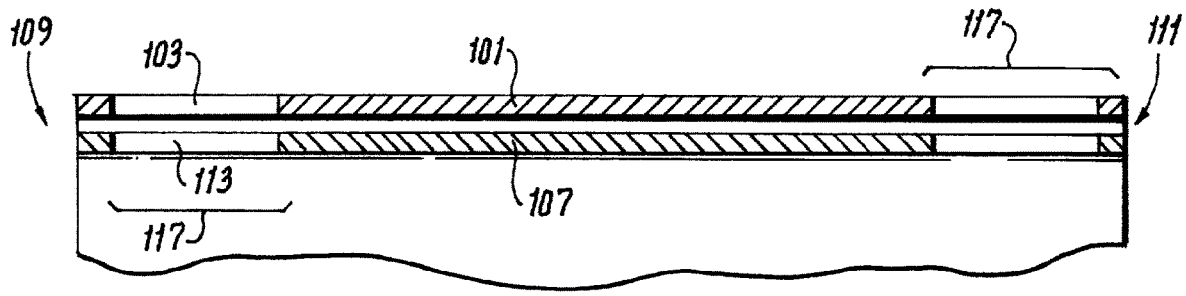
FIG. 4A is a schematic axi-symmetric axial cross-sectional view of the drive shaft of FIG. 3, showing a configuration of locations of the one or more channels of the first tube body relative to the second tube body.
Figure 4B:
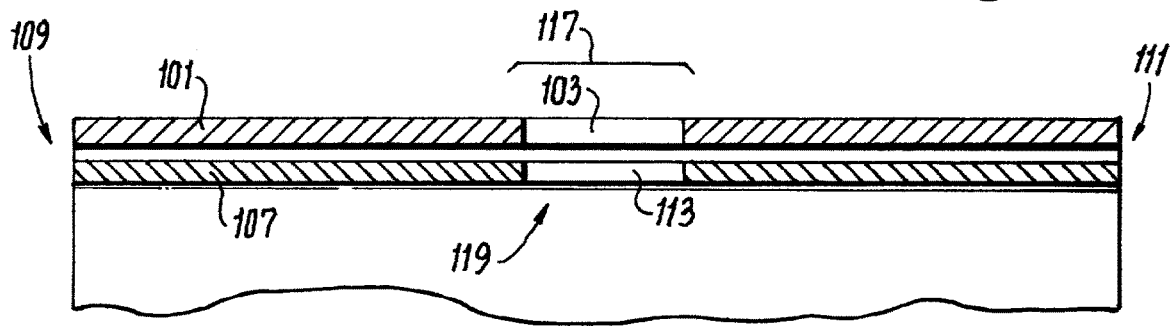
FIG. 4B is a schematic axi-symmetric axial cross-sectional of an embodiment of a drive shaft in accordance with this disclosure, showing another configuration of locations of the one or more channels of the first tube body relative to the second tube body.
Figure 4C:
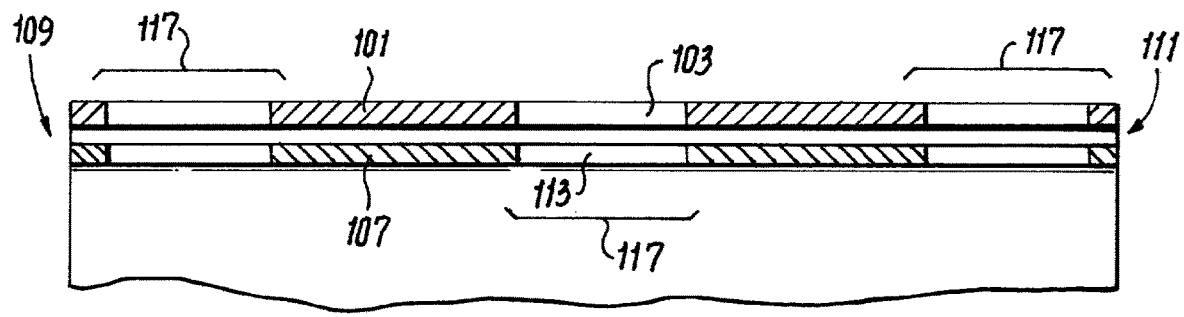
FIG. 4C is a schematic axi-symmetric axial cross-sectional view of an embodiment of a drive shaft in accordance with this disclosure, showing another configuration of locations of the one or more channels of the first tube body relative to the second tube body.
Figure 4D:
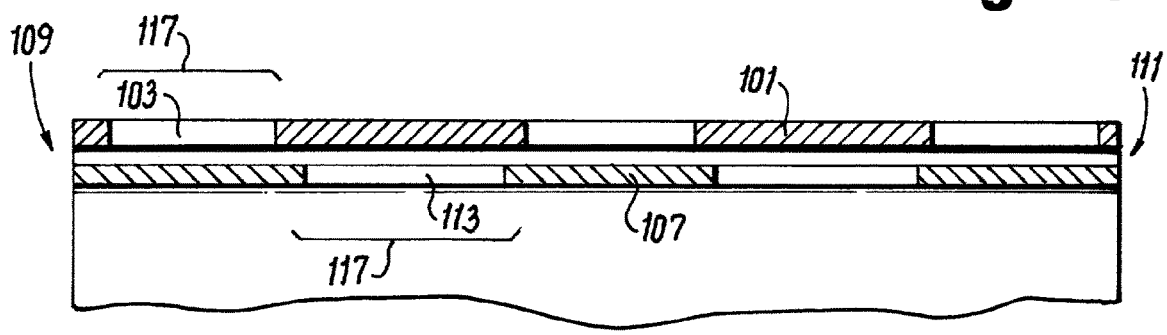
FIG. 4D is a schematic axi-symmetric axial cross-sectional view of an embodiment of a drive shaft in accordance with this disclosure, showing another configuration of locations of the one or more channels of the first tube body relative to the second tube body.

With reference to FIG. 2, in certain embodiments, the one or more first body channels 103 can be angled at a first channel angle a1 relative to an axial direction A such that the one or more first body channels 103 form one or more first helical pathways 103a/103b in the first tube body 101. In certain embodiments, the one or more second body channels 113 can be angled at a second channel angle a2 relative to the axial direction A such that the one or more second body channels 113 form one or more second helical pathways 113a/113b in the second tube body 107.

For example, as shown, the first channel angle α1 can be about (e.g. +/−15 degrees) 45 degrees relative to the axial direction A, and the second channel angle α2 can be about −45 degrees relative to the axial direction A such that the one or more first body channels 103 and the one or more second body channels 113 run in symmetric orientations to one another with respect to the axial directions. Such a configuration can provide additional torsional stiffness to the driveshaft 100. In case of significant axial and/or bending load conditions, deviations from +45/−45 degrees can be justified. Therefore, in certain embodiments, helical angles α1 and α2 can also be defined within range of +/−15 degrees with respect to +/−45 degrees, i.e., a range between +30 and +60 degrees for α1 and a range between −30 and −60 degrees for α2, respectively.

In certain embodiments, the one or more first or second helical pathways 103a/103b, 113a/113b can include a plurality of helix channels axially offset, either uniformly or non-uniformly, to wind within each other (e.g., similar to a double-helix or multi-helix shape). Any suitable angle a or width w is contemplated herein, for example, any other suitable angle for first and second channels 103, 113, and any suitable width of channels 103, 113, tuned to provide appropriate bending and/or axial flexibility of the tube bodies 101, 107 while only allowing for a less than proportional reduction in torsional stiffness as desired, is contemplated herein. Similarly, different geometries of ends of the channels and their through-thickness shapes can be suitable depending on specifics of service, fabrication or applied materials.

As shown in FIGS. 3A and 3B, the second tube body 107 can be concentrically disposed relative to the first tube body 101. The second tube body 107 can be connected to the first tube body at a first end 109 and a second end 111 in any suitable manner. The first end 109 of the second tube body 107 can be connected to the first end 109 of the first tube body 101, and the second end 111 of the second tube body 107 can be connected to the second end 111 of the second tube body 101. When connecting the tube bodies 101, 107, the relative location of the channels 103 to channels 113 can be adjusted as needed to achieve the desired flexibility of the drive shaft. Examples of locations of channels 103, 113 are shown in FIGS. 4A-4D.

With reference to FIG. 4, locations of channels 103, 113 in the one or more first and/or second bodies can be defined having limited axial length 117 and at one or more axial locations of the first and/or second tube bodies 101, 107. In certain embodiments, the one or more axial locations can include each end 109, 111 of the first and/or second tube bodies 101, 107, for example as shown in FIG. 4A. In certain embodiments, such as shown in FIG. 4B, the one or more axial locations 117 can include the axial center 119 of the first and/or second tube bodies 101, 107. In certain embodiments, such as shown in FIG. 4C, the one or more axial locations 117 can include both the axial center 119 and each end 109, 111 of the first and/or second tube bodies 101, 107. In certain embodiments, such as shown in FIG. 4D, the one or more axial locations 117 of the first body channels 103 can be different than the one or more axial locations 117 of the second body channels 113. As will be appreciated by those having ordinary skill in the art, the tube bodies 101, 107 can have the same or different respective wall thicknesses, channel configurations, and/or channel angles.

Referring now to FIG. 5, the system 100 can further include a sleeve 121 (e.g., disposed between the first and second tube bodies 101, 107) configured to connect to one or both of the first and second tube bodies 101, 107 at a respective end thereof, for example one of ends 109, 111 with a fastener 123. In certain embodiments, such as shown in FIG. 5A, the sleeve 121 can separately connect to the first and second tube bodies 101, 107 at different axial locations, for example with multiple fasteners 123. In certain embodiments, the sleeve 121 can include a plurality of sleeve bodies, 121a, 121b (e.g., an internal sleeve 121a and an external sleeve 121b) connected together, where the internal sleeve 121a is configured to fasten to the second tube body 107 and the external sleeve 121b is configured to fasten to the first tube body 101. Any suitable connection between the tube bodies 101, 107, and sleeve bodies 121a, 121b is contemplated herein.

Figure 5A:
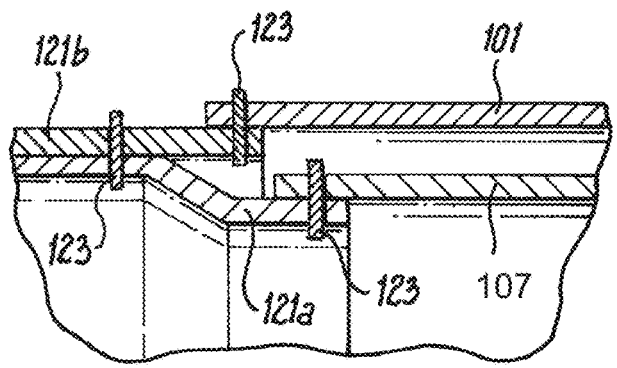
FIG. 5A is a partial schematic view of the axi-symmetrical axial cross section of the drive shaft of FIG. 3, showing a connection between the first tube body, the second tube body, and a sleeve.
Figure 5B:
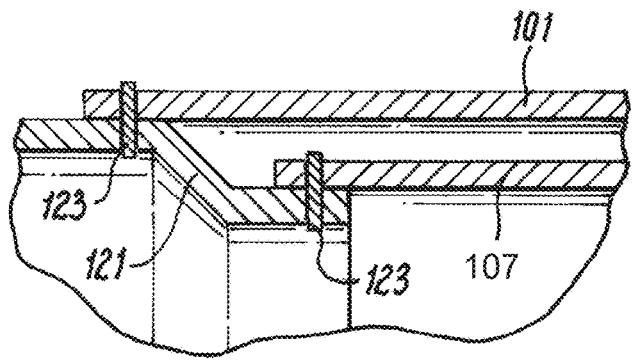
FIG. 5B is a partial schematic axi-symmetrical axial cross section of an embodiment of a drive shaft in accordance with this disclosure, showing another connection between the first tube body, the second tube body, and a sleeve.
Figure 5C:
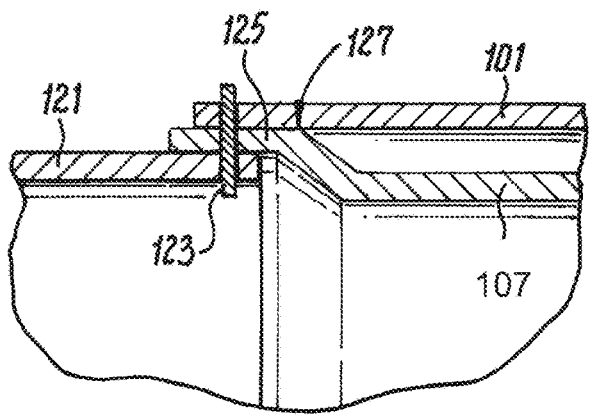
FIG. 5C is an partial schematic axi-symmetrical axial cross section of an embodiment of a drive shaft in accordance with this disclosure, showing another connection between the first tube body, the second tube body, and a sleeve.
Figure 5D:
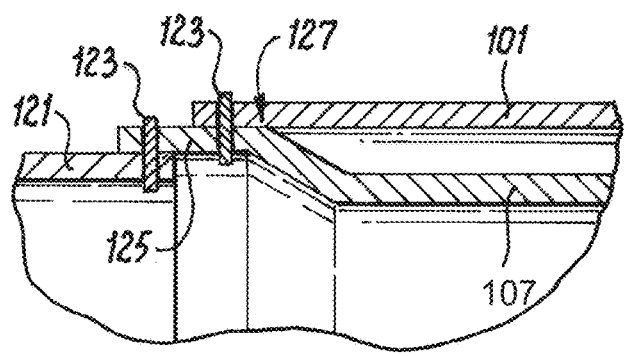
FIG. 5D is an partial schematic axi-symmetrical axial cross section of an embodiment of a drive shaft in accordance with this disclosure, showing another connection between the first tube body, the second tube body, and a sleeve.

In certain embodiments, the sleeve can be a single sleeve body 121. In certain embodiments, such as shown in FIG. 5B, the first and second tube bodies 101, 107 can be connected to the single sleeve 121 at separate locations. In certain embodiments, the sleeve 121 can be connected to both the first and second tube bodies 101, 107 (e.g., at a single location). For example, in certain embodiments such as shown in FIG. 5C, the second tube body 107 can include at least a portion 125 configured to contact an inner diameter 127 of the first tube body 101 where there is a connection between the first and second tube bodies 101, 107 and the sleeve 121, for example, where the portion 125 of the second tube body 107 is sandwiched between the sleeve 121 and the first tube body 101. In certain embodiments, such as shown in FIG. 5D, the sleeve 121 can connect to one of the first tube body 101 or the second tube body 107 and the first and second tube bodies 101, 107 can be connected together (e.g., to each other) separately from the sleeve 121, and the connected first and second tube bodies 101, 107 can connect to the sleeve 121.

Figure 6:
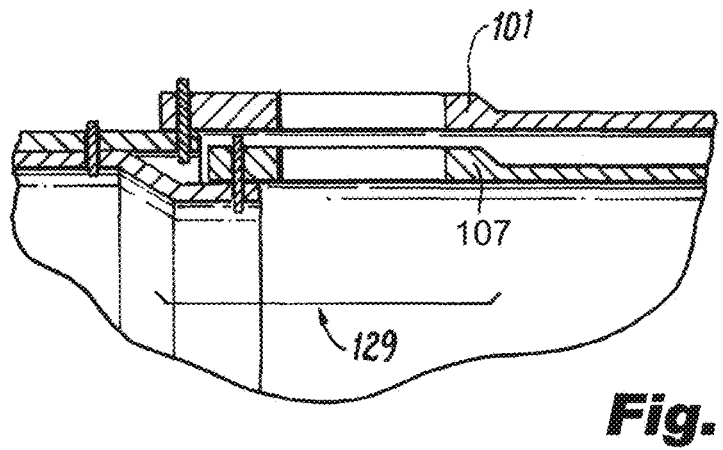
FIG. 6 is a partial schematic axi-symmetrical axial cross section of an embodiment of a drive shaft in accordance with this disclosure, showing another connection between another embodiment of the first tube body, the second tube body, and a sleeve.

With reference to FIG. 6, in certain embodiments, each end 109, 111 of the first and/or second tube body 101, 107 can include a thickened section 129. The wall thickness of the tube bodies 101, 107 can be larger than a remainder of the tube bodies 101, 107, e.g., to compensate for additional stress in the thickened areas, for example. Increased wall thickness can also be added to other portions of first and/or second tubes with the channels.

Figure 7A:
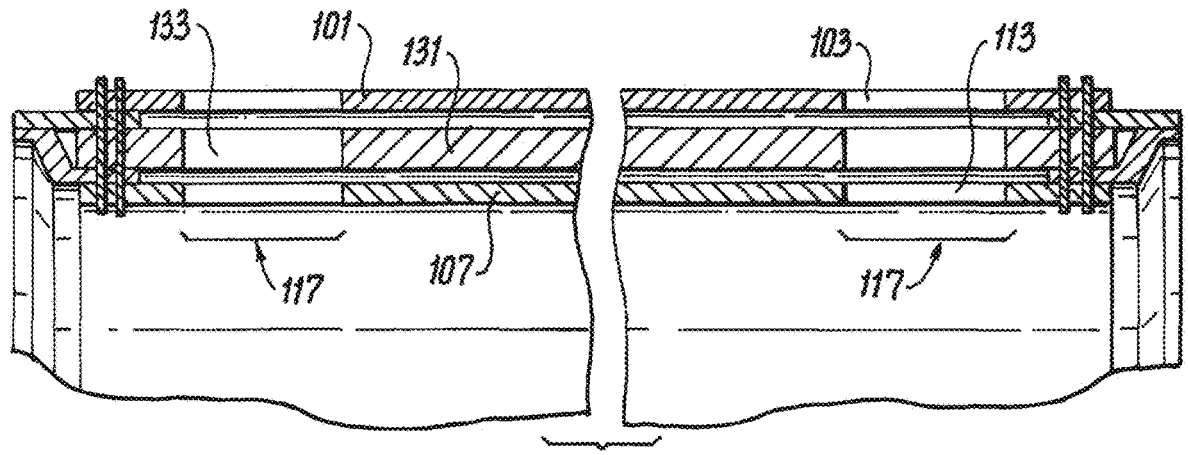
FIG. 7A is a schematic axi-symmetrical axial cross section of an embodiment of a drive shaft in accordance with this disclosure, showing a another configuration, consisting of the first tube body, the second tube body, a third tube body and a sleeve.
Figure 7B:
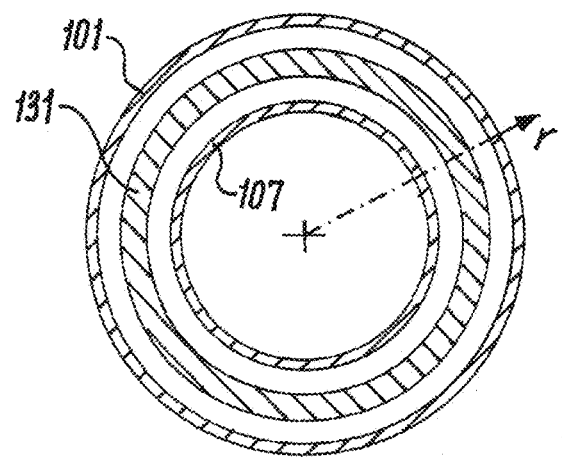
FIG. 7B is a schematic diametric cross-sectional view of the drive shaft of FIG. 7A, showing the first tube body, the second tube body, and the third tube body concentrically arranged.

With reference to FIG. 7, a third tube body 131 can be included and can be concentric with at least the first and/or second tube bodies 101, 107. The third tube body 131 can be included between the first and second tube bodies 101, 107 and can have a larger wall thickness (e.g., approximately double, depending on diameters of the first, second and third bodies) than at least the first and/or second tube bodies 101, 107. A larger wall thickness for the third tube body 131 can compensate for torque in both the first and second tube bodies 101, 107. The third tube body 131 can have one or more third body channels 133 in the axial location 117, for example matching the axial location of the channels 103, 113. In this case, the channels 133 can have a third channel angle $\alpha3$ relative to the axial direction A that is different than the first channel angle $\alpha1$ and second channel angle $\alpha2$, for example, $\alpha1$ can be +45 degrees, $\alpha2$ can be +45 degrees, and $\alpha3$ can be in the opposite direction, as −45 degrees.

Similarly to the above-described two-body designs, values of angles $\alpha1$, $\alpha2$ and $\alpha3$ may vary depending on specifics of load conditions (e.g., range of axial and/or bending loads relative to the torsional moment) and design requirements. The first and second ends 109, 111 can be connected in any suitable manner, for example any manner described herein. Any suitable number of tube bodies having any suitable number and type of channels, and connected in any suitable manner to provide the desired performance is contemplated. Moreover, any suitable combination of embodiments as described herein is contemplated.

Embodiments can be assembled in any suitable fashion, such as described with respect to FIG. 3A-FIG. 7B. In embodiments, both tube bodies 101, 107 can be mutually connected at their respective ends and attached to external sleeves for a system-level integration. Positioning the tube bodies 101, 107 relative to one another, such as shown in FIG. 4, for example, can achieve through-length positioning of zones with channels. Embodiments can include end joints with different sleeve configurations and topologies for mutual connections. Embodiments can include increased thickness of tube walls is suggested in zones with channels to compensate for stress concentrations and reduced cross-section due to channel placement. Radial thicknesses of the tube bodies can be adjusted to take into account some difference in corresponding diameters.

Embodiments can provide advantages over conventional drive shafts, for example providing the same structural performance, e.g., high torsional stiffness/strength and with low bending/axial stiffness, while eliminating the need for diaphragms and costs associated therewith.

Embodiments can reduce manufacture costs, reduce manufacture time, ensure compliance with quality standards, increase product availability, an improved structural performance of system given the opportunity for a larger diameter (e.g., for strength and vibrations). Embodiments can be utilized for any suitable drive system, for example aircraft and rotorcraft applications. However, embodiments can be expanded upon to be implemented in applications such as shipbuilding, power turbines and automotive needs, among others. Embodiments can be used in composite designs, for example, fabricated using Automated Fiber Placing (AFP) manufacturing method. Accordingly, the present disclosure provides a solution for improved drive shafts through substitution of conventional diaphragms by proposed multi-body implementations.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A drive shaft, comprising:
  a first tube body having one or more first body channels defined through a wall thickness thereof;
  a second tube body concentrically disposed relative to the first tube body and connected to the first tube body at a first end portion and a second end portion, wherein the second tube body includes one or more second body channels defined through a wall thickness thereof, a sleeve configured to connect to one or both of the first and second tube bodies at respective ends thereof, wherein the sleeve separately connects to the first and second tube bodies at different axial locations.

2. The drive shaft of claim 1, wherein the one or more first body channels and/or the one or more second body channels are configured to increase bending and/or axial flexibility of the shaft.

3. The drive shaft of claim 2, wherein the one or more first body channels are angled at a first channel angle relative to an axial direction such that the one or more first body channels form one or more first helical pathways in the first tube body.

4. The drive shaft of claim 3, wherein the one or more second body channels are angled at a second channel angle relative to an axial direction such that the one or more second body channels form one or more second helical pathways in the second tube body such that second channel angle and the first channel angle have orientations mutually symmetric with respect to the axial direction.

5. The drive shaft of claim 4, wherein the first channel angle is about 45 degrees relative to the axial direction, and the second channel angle is about −45 degrees relative to the axial direction such that the one or more first body channels and the one or more second body channels have orientations mutually symmetric with respect the axial direction.

6. The drive shaft of claim 5, wherein the one or more axial locations include an axial middle portion of the first and/or second tube bodies.

7. The drive shaft of claim 5, wherein the one or more axial locations include both the axial middle portion and each end portion of the first and/or second tube bodies.

8. The drive shaft of claim 3, wherein the one or more first or second helical pathways include a plurality of helix channels axially offset in an axial and/or circumferential directions.

9. The drive shaft of claim 3, wherein the one or more first and/or second body channels are defined having limited axial length and positioned at one or more axial locations of the first and/or second tube bodies.

10. The drive shaft of claim 9, wherein the one or more axial locations include each end portion of the first and/or second tube bodies.

11. The drive shaft of claim 10, wherein the one or more axial length and/or locations of the first body channels is different than the one or more axial length and/or locations of the second body channels.

12. The drive shaft of claim 1, wherein the sleeve includes a plurality of sleeve bodies connected together.

13. The drive shaft of claim 1, wherein the second tube body includes at least a portion configured to contact an inner diameter of the first tube body where there is a connection between the first and second tube bodies, wherein the sleeve is connected to at least one the first and second tube bodies.

14. The drive shaft of claim 13, wherein the sleeve connects to one of the first tube body or the second tube body, and wherein the first and second tube bodies are connected together at an axial location separate from where the sleeve connects to the first tube body or the second tube body.

15. The drive shaft of claim 1, wherein at least a portion the first and/or second tube body includes a wall thickened section.

16. The drive shaft as recited in claim 1, further comprising:

a third tube body concentrically disposed relative to the second tube body and having one or more third body channels defined through a third wall thickness thereof, wherein the one or more third body channels are angled at a third channel angle relative to an axial direction such that the one or more third body channels form one or more third helical pathways in the third tube body, and wherein the third body is connected to the first tube body and the second tube body at the first end portion and the second end portion.

17. The drive shaft of claim 1, wherein the one or more first body channels and the one or more second tube body channels are axially offset from one another in an axial and/or circumferential direction.

18. A drive shaft, comprising:

a first tube body having one or more first body channels defined through a wall thickness thereof;

a second tube body concentrically disposed relative to the first tube body and connected to the first tube body at a first end portion and a second end portion, wherein the second tube body includes one or more second body channels defined through a wall thickness thereof, a sleeve configured to connect to one or both of the first and second tube bodies at respective ends thereof via a first fastener and a second fastener, wherein the sleeve separately connects to the first and second tube bodies at a first axial location and a second axial location, wherein the second tube body includes a portion configured to contact an inner diameter of the first tube body where there is a connection between the first and second tube bodies, wherein the sleeve is connected to the second tube body, wherein the first and second tube bodies are connected together at the first axial location through the first fastener and the second axial location through the second fastener, wherein the first fastener extends only through the wall thickness of the first tube body, and a wall thickness of the sleeve, and wherein the second fastener extends only through the wall thickness of the second tube body and the wall thickness of the sleeve.

19. A drive shaft, comprising:

a first tube body having one or more first body channels defined through a wall thickness thereof;

a second tube body concentrically disposed relative to the first tube body and connected to the first tube body at a first end portion and a second end portion, wherein the second tube body includes one or more second body channels defined through a wall thickness thereof, a first sleeve configured to connect to the first tube body at a first axial location at an axial end of the first tube body; and a second sleeve configured to connect to the second tube body at a second axial location at an axial end of the second tube body, wherein the second axial location is different than the first axial location.

20. The drive shaft of claim 19, wherein the first sleeve and the second sleeve are configured to connect to one another at a third axial location different from the first axial location and different from the second axial location.

* * * * *